Patented Sept. 8, 1942

2,295,077

UNITED STATES PATENT OFFICE 2,295,077

METHOD OF MAKING VINYL-AROMATIC COMPOUNDS

Robert R. Dreisbach and James Day, Midland, Mich., assignors to The Dow Chemical Company, Midland, Mich., a corporation of Michigan No Drawing. Application January 14, 1939, Serial No. 251,048

10 Claims. (Cl. 260—650)

This invention concerns an improved method of making vinyl-aromatic compounds from halogenated aromatic hydrocarbons having the general formula: R—$C_2H_4$—X wherein R is an aromatic radical which may contain halogen or hydrocarbon substituents in its nucleus and X is halogen.

It is well known that styrene may be formed by splitting hydrogen halide from the molecule of a halo-ethylbenzene, and several methods for carrying out such reaction have been proposed. The dehydrohalogenation has been accomplished by pyrolyzing the halo-ethylbenzene at temperatures between 500° and 725° C. This pyrolysis method is reported in U. S. Patent No. 1,687,903 to yield styrene regardless of whether the halo-ethylbenzene reactant contains its halogen in the ethyl group or in its nucleus. However, the same patent shows that the pyrolysis results in tar formation. Styrene has been produced from alpha-chloro-ethylbenzene by heating the latter with an agent such as pyridine, which reacts to remove hydrogen chloride from the chloro-ethylbenzene, but the expense of using pyridine, or other amine, in the large proportions required renders this method poorly suited to commercial practice.

A third general method for producing styrene from side-chain halogenated ethylbenzene has comprised heating the latter at a temperature of 150°–175° C., or thereabout, with a catalyst which is effective in promoting dehydrohalogenation of the halo-ethylbenzene and distilling off the styrene during or subsequent to the reaction. Natelson, J Ind. Eng. Chem. 25 1391 (1933), has studied the catalytic dehydrohalogenation using a wide variety of catalysts and also testing certain variations in operating procedure, but he reports that the maximum yield of styrene from the catalytic reaction was only 65 per cent of theoretical and that a large amount of dark-colored material which could not be steam distilled was invariably obtained. He indicates that a mercury-silver couple and mercurous chloride were the most satisfactory catalysts tested, but shows that a wide variety of other substances, e. g. mercuric chloride, mercuric oxide, mercuric sulphate, mercuric acetate, zinc chloride, a mercury-copper couple, etc., are also catalysts for the reaction. The procedures employed by Natelson in carrying out the reaction were: (1) to add a small proportion of catalyst to the halo-ethylbenzene and then heat the mixture under vacuum to generate styrene and distill it from the mixture; and (2) to heat the catalyst under vacuum and then introduce the halo-ethylbenzene while distilling styrene from the reactor.

We have found that by introducing both a catalyst and the halo-ethylbenzene gradually into a heated chamber while distilling styrene from the latter, styrene may be produced in yields far higher than have previously been obtainable with the same catalyst. We have further found that the reaction proceeds more favorably at temperatures between 200° and 350° C. than it does at the lower temperatures of 150°–175° C. heretofore employed. We also have found that unreacted halo-ethylbenzene, if permitted to accumulate in the reacting mixture, interferes with the distillation of styrene as it is formed and promotes by-product formation, and that the yield of styrene is highest when the inventory of halo-ethylbenzene in the reactor is held at a minimum. We have further found that our method, as just outlined, may be applied in dehydrohalogenating other halogenated aromatic hydrocarbons containing a halo-ethyl group to obtain corresponding vinyl-aromatic compounds and that when applied in dehydrohalogenating such aromatic compound which is halogenated in its nucleus as well as in the side-chain, the nuclear halogen substituents usually remain intact and a nuclear halogenated vinyl-aromatic compound is obtained.

In producing styrene from alpha-chloro-styrene, said compound is introduced gradually, along with a small proportion of dehydrohalogenation catalyst, into a chamber (preferably the pot of a still) heated sufficiently to cause the reaction and distill styrene from the chamber as it is formed. The reaction may be carried out at atmospheric pressure and at any reaction temperature below that at which the styrene is decomposed or polymerized too rapidly to permit its distillation, but it preferably is carried out at temperatures between 200° and 350° C. under vacuum. The catalyst is preferably mixed with the chloro-ethylbenzene as the latter is fed into the reactor so as to avoid possibility that the catalyst may settle out and be unevenly distributed in the chloro-ethylbenzene. A certain amount of catalyst tends to accumulate in the reactor and this accumulated catalyst may be used to carry on the reaction over limited periods of time. Accordingly, instead of introducing the catalyst continuously along with the chloro-ethylbenzene reactant in the preferred manner just stated, it may, if desired, be added periodically during the reaction either alone or together with the chloro-ethylbenzene. As the catalyst we usually employ mercurous chloride, but any other catalyst capable of promoting the reaction, e. g. mercuric chloride, mercuric oxide, mercuric acetate, mercuric sulphate, zinc chloride, a mercury-silver couple, a mercury-copper couple, etc., may be used if desired. The catalyst is preferably employed in amount corresponding to between 0.1 and 1.0 per cent of the weight of the chloro-ethylbenzene, but it may be used in smaller or larger proportions.

During operation as just described, care is preferably taken to avoid accumulating at one time in the reactor more unreacted chloro-ethylbenzene than is decomposed to styrene in a ten-minute period under the reaction conditions employed. This is accomplished by balancing the input of chloro-ethylbenzene against the rate at which styrene is distilled from the reactor. Hydrogen chloride evolved during the reaction is, of course, collected as a by-product.

In operating as above-described, a small amount of high-boiling oily material frequently is formed and accumulates in the reactor during the initial stages of the reaction, but as the process continues formation of such high-boiling material ceases and styrene is produced almost quantitatively. This initial formation of high-boiling material is due principally to local overheating of the reaction mixture as it strikes the heated walls of the reactor. Formation of the high-boiling material may largely be avoided, if desired, by decreasing the pressure on the system so as to distill the styrene immediately after its formation. However, this leads to inconvenient operating conditions and is unnecessary. The small amount of high-boiling material initially formed serves as an excellent medium for the reaction, and its presence is advantageous rather than detrimental. At the start of a reaction, we frequently charge the reaction vessel with such high-boiling material from a prior run so as to avoid further formation of the same and increase the yield of styrene.

By careful distillation of styrene from the reaction mixture as it is formed, the styrene may be obtained directly in nearly pure condition. However, the distillation is usually carried out to obtain a distillate containing from 70 to 90 per cent by weight of styrene and from 10 to 30 per cent of ureacted chloro-ethylbenzene. Pure styrene is then separated by redistillation.

The method as described above may be applied in making a wide variety of vinyl-aromatic compounds from haloethyl aromatic compounds other than alpha-chloro-ethylbenzene. For instance, it can be used to make para-chloro-styrene from alpha-chloro-ethyl para-chlorobenzene; meta-bromo-styrene from alpha-chloro-ethyl meta-bromobenzene; ortho-chloro-styrene from beta-chloro-ethyl ortho-chlorobenzene; styrene from beta-chloro-ethylbenzene; styrene from alpha - bromo - ethylbenzene; styrene from beta-bromo-ethylbenzene; ortho-para-dichloro-styrene from alpha-chloro-ethyl ortho-para-dichlorbenzene; meta-ethyl styrene from alpha-chloro-ethyl meta-ethylbenzene; etc.

The following examples illustrate certain ways in which the principle of the invention has been applied, but are not to be construed as limiting the invention.

*Example 1*

Into a flask provided with a distilling column and containing 45 grams of the high-boiling material resulting from heating alpha-chloro-ethylbenzene with mercurous chloride, there was introduced gradually an isomeric mixture of about 90 per cent alpha-chloro-ethylbenzene and 10 per cent beta-chloro-ethylbenzene, which isomeric mixture had about 0.1 per cent by weight of mercurous chloride intermixed therewith. The mercurous chloride was added gradually to the chloroethylbenzene as the latter was fed to the reaction. While adding the chloro-ethylbenzene and catalyst in such manner, the mixture within the flask was heated at a temperature of 225°–230° C. under an absolute pressure of 420 millimeters of mercury, and styrene was distilled therefrom as it was formed. A total of 562 grams of chloro-ethylbenzene was introduced to the reaction and 431 grams of distillate was recovered. The distillate contained 278 grams of styrene and approximately 153 grams of unreacted chloro-ethylbenzene. Only 54 grams of material remained in the reaction flask at the close of the reaction. The yield of styrene was 92 per cent of theoretical, based on the chloro-ethylbenzene consumed.

*Example 2*

A mixture of isomeric chloro-ethyl-chloro-benzenes was prepared by ethylating chlorobenzene and then chlorinating the ethyl-chlorobenzene in its side-chain. 475 grams of this isomeric mixture was treated with 0.5 gram of mercurous chloride and the resultant mixture was heated under vacuum to distill styrene therefrom. 100 grams of high-boiling material remained as residue from the distillation. This residue was used as a medium for subsequent operation in accordance with the invention, as follows: While heating the residue at a temperature of 330° C. and a pressure of 460 millimeters, 613 grams of chloro-ethyl-chlorobenzene having 0.4 gram of mercurous chloride admixed therewith was introduced gradually and styrene was distilled from the reaction vessel as it was formed. Care was taken to introduce the chloro-ethyl-chlorobenzene at a rate corresponding to that at which styrene was distilled from the reactor so that appreciable accumulation of unreacted chloro-ethyl-chlorobenzene in the reaction mixture was avoided. From the 613 grams of chloro-ethyl-chlorobenzene there was obtained 470 grams of distillate containing 376 grams of nuclear-monochlorinated styrene and 94 grams of unreacted chloro-ethyl-chlorobenzene. The yield of chloro-styrene was 91.5 per cent of theoretical, based on the chloro-ethyl-chlorobenzene consumed.

It sometimes is desirable to have present in the reacting mixture an agent which will inhibit polymerization of the vinyl-aromatic product, and such agent may be used in practicing the invention. Examples of such inhibiting agents are catechol, para-tertiarybutyl catechol, pyrogallol, etc. Other agents for inhibiting the polymerization of vinyl-aromatic compounds are known to the art.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making a vinyl-aromatic compound by the catalytic dehydrohalogenation of a halogenated compound having the general formula R—C₂H₄—X wherein R is an aromatic radical and X is halogen, the steps of introducing the halogenated compound and the catalyst to the reaction as the latter progresses while distilling the vinyl-aromatic product from the liquid reaction mixture.

2. In a method of making a vinyl-aromatic compound by the catalytic dehydrochlorination of a chlorinated compound having the general formula R—C₂H₄—Cl wherein R is an aromatic radical, the steps of gradually introducing the chlorinated compound and the catalyst to a reaction zone, wherein the mixture is heated at sub-atmospheric pressure to a reaction temperature between 200° and 350° C. in the presence of a liquid reaction medium, while distilling the vinyl-aromatic product from the mixture as it is formed, the rate at which the chlorinated organic reactant is introduced to the reaction being controlled so as to prevent substantial accumulation of the same in the reacting mixture.

3. In a method of making a vinyl-aromatic compound by the catalytic dehydrohalogenation of a halogenated compound having the general formula R—C₂H₄—X wherein R is an aromatic radical and X is halogen, the steps of gradually introducing the halogenated compound and a small proportion of mercurous chloride to a reaction zone, wherein the mixture is heated at sub-atmospheric pressure to a reaction temperature between 200° and 350° C. in the presence of a liquid reaction medium, while distilling the vinyl-aromatic product from the mixture as it is formed, the rate at which the halogenated organic reactant is introduced to the reaction being controlled so as to prevent substantial accumulation of the same in the reacting mixture.

4. In a method of making styrene by the catalytic dehydrohalogenation of a monohalo-ethylbenzene containing its halogen in the side-chain, the steps of gradually introducing the halo-ethylbenzene and the catalyst to a reaction zone, wherein the mixture is heated to a reaction temperature in the presence of a liquid reaction medium, and distilling styrene from the mixture as it is formed, the rate at which the halo-ethylbenzene reactant is introduced to the reaction being controlled so as to prevent substantial accumulation of the same in the reacting mixture.

5. In a method of making styrene by the catalytic dehydrochlorination of a mono-chloro-ethylbenzene containing its chlorine in the side-chain, the steps of gradually introducing the chloro-ethylbenzene and catalyst to a reaction zone, wherein the mixture is heated at sub-atmospheric pressure to a reaction temperature between 200° and 350° C. in the presence of a liquid reaction medium, while distilling styrene from the mixture as it is formed, the rate at which the chloro-ethylbenzene is introduced to the reaction being controlled so as to prevent substantial accumulation of the same in the reacting mixture.

6. In a method of making styrene by the catalytic dehydrochlorination of alpha-chloro-ethylbenzene, the steps of gradually introducing the alpha-chloro-ethylbenzene and a small proportion of mercurous chloride to a reaction zone, wherein the mixture is heated at sub-atmospheric pressure to a reaction temperature between 200° and 350° C. in the presence of a liquid reaction medium, while distilling styrene from the mixture as it is formed, the rate at which the alpha-chloro-ethylbenzene is introduced to the reaction being controlled so as to prevent substantial accumulation of the same in the reacting mixture.

7. In a method of making a nuclear-halogenated styrene by the catalytic dehydrohalogenation of a nuclear-halogenated halo-ethylbenzene, which compound contains a halogen atom attached to the ethyl group, the steps of gradually introducing the nuclear-halogenated halo-ethylbenzene and the catalyst to a reaction zone, wherein the mixture is heated in the presence of a liquid reaction medium to a reaction temperature, and distilling nuclear-halogenated styrene from the mixture as it is formed, the rate at which the nuclear-halogenated halo-ethylbenzene reactant is introduced to the reaction being controlled so as to prevent substantial accumulation of the same in the reacting mixture.

8. In a method of making nuclear-chlorinated styrene by the catalytic dehydrochlorination of a nuclear-chlorinated chloro-ethylbenzene, which compound contains a chlorine atom attached to the ethyl group, the steps of gradually introducing the nuclear-chlorinated chloro-ethylbenzene and a small proportion of mercurous chloride to a reaction zone, wherein the mixture is heated at sub-atmospheric pressure to a reaction temperature between 200° and 350° C. in the presence of a liquid reaction medium, and distilling nuclear-chlorinated styrene from the mixture as it is formed, the rate at which the nuclear-chlorinated chloro-ethylbenzene reactant is introduced to the reaction being controlled so as to prevent substantial accumulation of the same in the reacting mixture.

9. In a method of making nuclear-monochlorinated styrene by the catalytic dehydrochlorination of a chloro-ethyl-chlorobenzene, which compound contains a chlorine atom attached to the ethyl gruop and another chlorine atom attached to the benzene nucleus, the steps of gradually introducing the chloro-ethyl-chlorobenzene and the catalyst to a reaction zone wherein the mixture is heated in the presence of a liquid reaction medium to a reaction temperature, and distilling nuclear chlorinated styrene from the mixture as it is formed, the rate at which the chloro-ethyl-chlorobenzene reactant is introduced to the reaction being controlled so as to prevent substantial accumulation of the same in the reacting mixture.

10. In a method of making para-chloro-styrene by the catalytic dehydrochlorination of a para-(chloro-ethyl-) chlorobenzene, the steps of gradually introducing the latter and a small proportion of mercurous chloride to a reaction zone wherein the mixture is heated at subatmospheric pressure to a reaction temperature between 200° and 350° C. in the presence of a liquid reaction medium, and distilling para-chloro-styrene from the mixture as it is formed, the rate at which the para-(chloro-ethyl) chlorobenzene reactant is introduced to the reaction being controlled so as to prevent substantial accumulation of the same in the reacting mixture.

ROBERT R. DREISBACH.
JAMES DAY.